United States Patent [19]
Sakane et al.

[11] Patent Number: 5,788,345
[45] Date of Patent: Aug. 4, 1998

[54] ANTI-SKID CONTROL DEVICE

[75] Inventors: Shinsuke Sakane; Yoshifumi Misaka, both of Toyota, Japan

[73] Assignee: Aisin Seiki Kabushiki Kaisha, Kariya, Japan

[21] Appl. No.: 724,006

[22] Filed: Sep. 26, 1996

[30] Foreign Application Priority Data

Sep. 26, 1995 [JP] Japan .................. 7-247794

[51] Int. Cl.$^6$ ..................... B60T 8/58; B60T 8/66
[52] U.S. Cl. ..................... 303/146; 364/426.016
[58] Field of Search ..................... 303/140, 146, 303/147, 169, 113.1, 116.1, 119.1, DIG. 6; 364/426.016, 426.017

[56] References Cited

U.S. PATENT DOCUMENTS 5,015,041  5/1991  Kuwana et al. ............... 303/146

FOREIGN PATENT DOCUMENTS

| 4121954 | 1/1993 | Germany . |
| 61-291261 | 12/1961 | Japan . |
| 61-1564 | 1/1986 | Japan . |
| 2-68256 | 3/1990 | Japan . |
| 4-100766 | 4/1992 | Japan . |
| 2257551 | 1/1993 | United Kingdom . |

*Primary Examiner*—Josie Ballato
*Attorney, Agent, or Firm*—Burns, Doane, Swecker & Mathis, LLP

[57] ABSTRACT

An anti-skid control device includes wheel brake cylinders, a hydraulic pressure generator, and hydraulic pressure control valves for controlling the hydraulic braking pressure in each wheel brake cylinder. The wheel speeds of the plurality of wheels are sensed by respective wheel speed sensors, and the vehicle speed is calculated on the basis of the wheel speeds. A right vehicle speed is calculated on the basis of the wheel speed of one of the wheels on the right hand side of the vehicle and a left vehicle speed is calculated on the basis of the wheel speed of one of the wheels on the left hand side of the vehicle. A vehicle speed differential between the right vehicle speed and the left vehicle speed is calculated. A vehicle lateral acceleration is then calculated from the vehicle speed differential and the vehicle speed. When the vehicle lateral acceleration exceeds a first predetermined value before an anti-skid control starts operating during depression of the brake pedal, an increase rate of the hydraulic braking pressure in an inside rear wheel is reduced.

11 Claims, 9 Drawing Sheets

ANTI-SKID CONTROL DEVICE

FIELD OF THE INVENTION

The present invention generally relates to a vehicle braking control device, and more particularly pertains to an anti-skid control device for controlling the braking force applied to a plurality of wheels of an automotive vehicle when the wheels tend to lock.

BACKGROUND OF THE INVENTION

Conventional anti-skid control devices are disclosed in Japanese Patent Laid-open publication No. 4-100766 published on Apr. 2, 1992 and Japanese Patent Laid-open publication No. 61-1564 published on Jan. 7, 1986.

The first document mentioned above discloses an anti-skid device that includes four wheel brake cylinders, a master cylinder and four control valves. Each of the wheel brake cylinders is operatively connected to one of the four wheels to apply a braking force to the respective wheels. The master cylinder generates hydraulic pressure in response to a depression of a brake pedal and supplies the hydraulic pressure to the wheel brake cylinders. The control valves are connected to the master cylinder and respective ones of the wheel brake cylinders to control the hydraulic braking pressure in the wheel brake cylinders.

A wheel speed sensor is operatively associated with each wheel to sense the respective wheel speeds of the wheels. The vehicle speed is calculated on the basis of the wheel speeds detected by the four wheel speed sensors. Slip standard values corresponding to the four wheels are set on the basis of the vehicle speed to start the anti-skid control of the wheels. When the wheel speed of the front right wheel is lower than the slip standard value corresponding to the front right wheel, an anti-skid control operation for the front right wheel is started, so that the hydraulic braking pressure in the front right wheel brake cylinder is decreased.

The system is designed to determine if the vehicle is cornering based on a vehicle lateral acceleration sensed by a vehicle lateral acceleration sensor. When it is determined that the vehicle is cornering, the slip standard values corresponding to the inside wheels are changed to be lower than the slip standard values corresponding to the outside wheels. Further, differences between the slip standard values corresponding to the outside wheels and the slip standard values corresponding to the inside wheels are changed to be higher as the vehicle lateral acceleration increases. Therefore, the hydraulic braking pressure of the inside wheel brake cylinders is prevented from decreasing early so that the braking distance of the vehicle can be reduced.

In the anti-skid device described in the second document cited above, a hydraulic braking pressure corresponding to the rears wheel is held when a vehicle lateral acceleration exceeds a predetermined acceleration during the depression of a brake pedal. The vehicle lateral acceleration is sensed by a lateral acceleration sensor.

The anti-skid devices disclosed in the two documents mentioned above suffer from the disadvantage that they require vehicle lateral acceleration sensors. As a result, the anti-skid devices are expensive.

SUMMARY OF THE INVENTION

A need exists, therefore, for an anti skid control device which addresses at least the foregoing drawback of other known anti-skid control devices.

According to one aspect of the present invention, an anti-skid control device includes wheel brake cylinders, a hydraulic pressure generator, and hydraulic pressure control valves for controlling the hydraulic braking pressure in each wheel brake cylinder. The wheel speeds of the respective wheels are sensed by wheel speed sensors, and a vehicle speed is calculated on the basis of the wheel speeds. A right vehicle speed is calculated on the basis of the wheel speed of one of the wheels on the right hand side of the vehicle and a left vehicle speed is calculated on the basis of the wheel speed of one of the wheels on the left hand side of the vehicle. A vehicle speed differential between the right vehicle speed and the left vehicle speed is calculated. A vehicle lateral acceleration is calculated from the vehicle speed differential and the vehicle speed. When the vehicle lateral acceleration exceeds a first predetermined value before an anti-skid control starts operating during depression of the brake pedal, an increase rate of the hydraulic braking pressure in an inside rear wheel is reduced.

According to another aspect of the present invention, a vehicle lateral acceleration estimation device for estimating a lateral acceleration of an automotive vehicle includes a plurality of wheel speed sensors for sensing the wheel speeds of the wheels, a vehicle speed calculation device for calculating a vehicle speed on the basis of the wheel speeds sensed by the wheel speed sensors, a right vehicle speed calculation device for calculating a right vehicle speed on the basis of the wheel speed of one of the wheels on the right hand side of the vehicle sensed by the wheel speed sensors, a left vehicle speed calculation device for calculating a left vehicle speed on the basis of the wheel speed of one of the wheels on the left hand side of the vehicle sensed by the wheel speed sensors, and a speed differential calculation arrangement for calculating a vehicle speed differential between the right vehicle speed calculated by the right vehicle speed calculation device and the left vehicle speed calculated by left vehicle speed calculation device. A lateral acceleration calculation device is also provided for calculating the vehicle lateral acceleration on the basis of the vehicle speed differential calculated by the speed differential calculation arrangement and the vehicle speed calculated by the vehicle speed calculation device.

BRIEF DESCRIPTION OF THE DRAWING FIGURES

The foregoing and additional features of the present invention will become more apparent from the following detailed description of a preferred embodiment when considered with reference to the accompanying drawing figures in which like elements bear like reference numerals and wherein.

DETAILED DESCRIPTION OF THE PREFERRED EMBODIMENT

Figure 1:
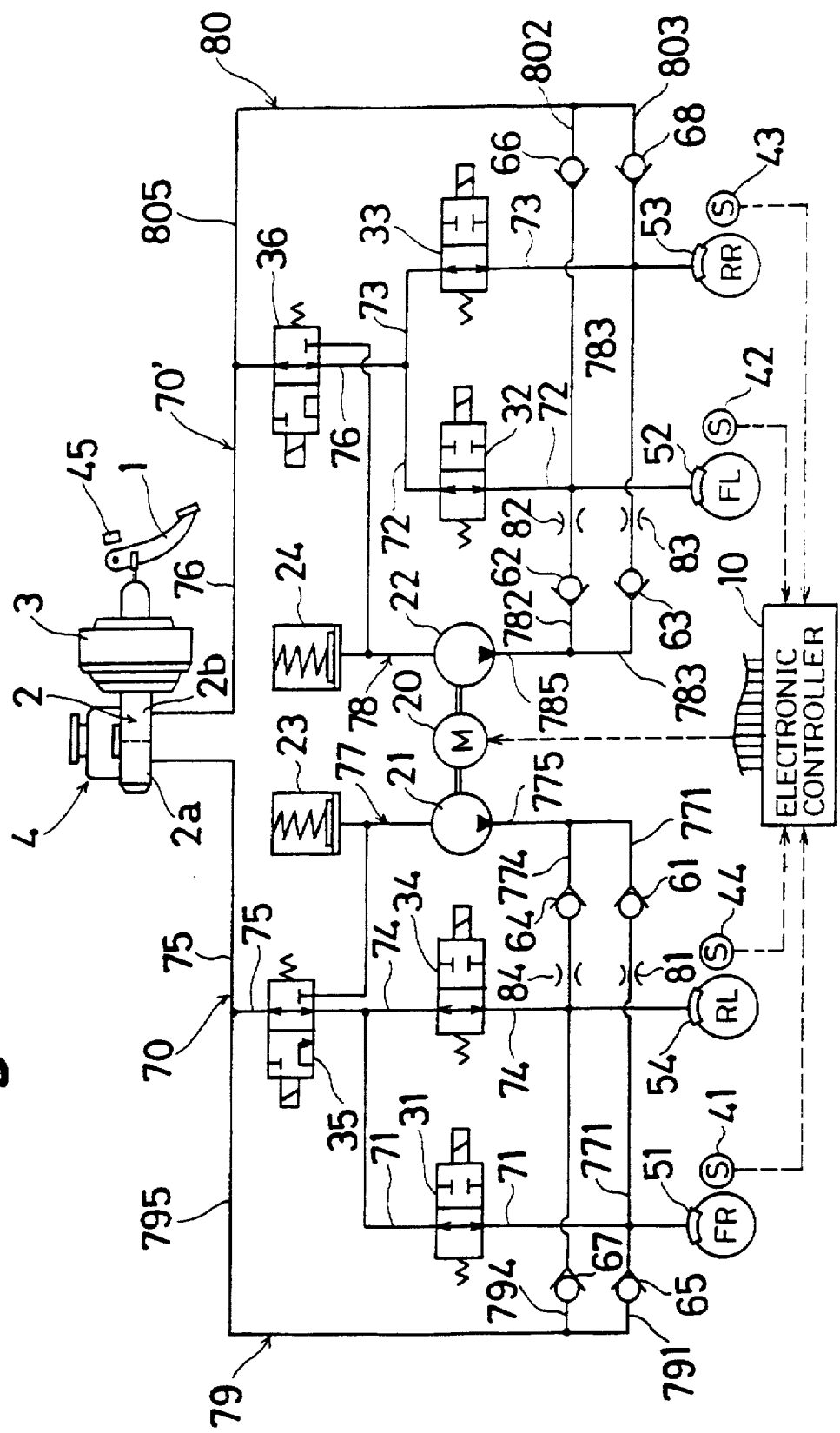
FIG. 1 is a schematic block diagram illustrating an anti-skid control device of the present invention.

With reference initially to FIG. 1, the anti-skid control device includes a master cylinder 2 that is connected to a brake pedal 1 via a vacuum booster 3. The master cylinder 2 includes a pair of pressure chambers 2a, 2b connected to a master reservoir 4 which stores brake fluid. The master cylinder 2 generates hydraulic pressure in response to the depression of the brake pedal 1.

One of the pressure chambers 2a of the master cylinder 2 is connected to a front right wheel brake cylinder 51 and a rear left wheel brake cylinder 54 via a first passage 70. The wheel brake cylinders 51, 54 are operatively connected to a front right wheel FR and a rear left wheel RL respectively to apply a braking force to the corresponding wheels FR, RL. The first passage 70 includes a main passage 75 and a pair of branch passages 71, 74. The main passage 75 is connected to the pressure chamber 2a. The branch passages 71, 74 branch from the main passage 75 and are connected to the respective wheels FR, RL.

Normally open solenoid valves 31, 34 are disposed in the branch passages 71, 74, respectively. A change over solenoid valve 35 is disposed in the main passage 75 and is positionable in a non-operation position and an operation position. When the change over valve 35 is positioned in the non-operation position shown in FIG. 1, the solenoid valves 31, 34 are connected to the pressure chamber 2a of the master cylinder 2 and disconnected from a sub-reservoir 23. When the change over valve 35 is positioned in the operation position, the solenoid valves 31,34 are disconnected from the pressure chamber 2a and connected to the sub reservoir 23.

The sub-reservoir 23 is connected to the front right wheel brake cylinder 51 and the rear left wheel brake cylinder 54 via a second passage 77. The second passage 77 includes a main passage 775 and a pair of branch passages 771, 774. The main passage 775 is connected to the sub-reservoir 23 while the branch passages 771, 774 branch from the main passage 775 and are connected to the wheels FR, RL, respectively.

A pump 21 is disposed in the main passage 775 and is driven by a motor 20. The pump 21 draws brake fluid from the sub-reservoir 23 and pumps the brake fluid to the wheel brake cylinders 51, 54 via the branch passages 771, 774. A check valve 61 and an orifice 81 are disposed in one of the branch passages 771. Also, a check valve 64 and an orifice 84 are disposed in the other branch passage 774. The check valves 61, 64 prevent brake fluid flow from one of the wheel brake cylinders 51, 54 to the other wheel brake cylinder 51, 54.

The wheel brake cylinders 51, 54 are connected to the main passage 75 at a point between the master cylinder 2 and the change over valve 35 via a return passage 79. The return passage 79 includes a main passage 795 and a pair of branch passages 791, 794. The main passage 795 is connected to the pressure chamber 2a, and the branch passages 791, 794 branch from the main passage 795 and are connected to the wheels FR, RL, respectively. Check valves 65, 67 are disposed in the respective branch passages 791, 794 to only permit brake fluid flow from the wheel brake cylinders 51, 54 to the master cylinder 2.

The other pressure chamber 2b of the master cylinder 2 is connected to a front left wheel brake cylinder 52 and a rear right wheel brake cylinder 53 via a third passage 70'. One of the wheel brake cylinders 52 is operatively connected to a front left wheel FL while the other wheel brake cylinder 53 is operatively connected to a rear right wheel RR to apply a braking force to the corresponding wheels FL, RR. The third passage 70' includes a main passage 76 and a pair of branch passages 72, 73. The main passage 76 is connected to the pressure chambers 2b, while the branch passages 72, 73 branch from the main passage 76 and are connected to the wheels FL, RR, respectively.

A normally open solenoid valve 32, 33 is disposed in each of the respective branch passages 72, 73. A change over solenoid valve 36 is disposed in the main passage 76 and is positionable in a non operation position and an operation position. When the change over valve 36 is positioned in the non-operation position shown in FIG. 1, the solenoid valves 32, 33 are connected to the pressure chamber 2b of the master cylinder 2 and are disconnected from a sub reservoir 24. When the change over valve 36 is positioned in the operation position, the solenoid valves 32, 33 are disconnected from the pressure chamber 2b and are connected to the sub-reservoir 24.

The sub reservoir 24 is connected to the front left wheel brake cylinder 52 and the rear right wheel brake cylinder 53 via a fourth passage 78. The fourth passage 78 includes a main passage 785 and a pair of branch passages 782, 783. The main passage 785 is connected to the sub-reservoir 24, and the branch passages 782, 783 branch from the main passage 785 and are connected to the wheels FL, RR, respectively.

A pump 22 is disposed in the main passage 785 and is driven by the motor 20 together with the pump 21. The pump 22 draws brake fluid from sub-reservoir 24 and pumps the brake fluid to the wheel brake cylinders 52, 53 via the branch passages 782, 783. A check valve 62 and an orifice 82 are disposed in the branch passage 782. Also, a check valve 63 and an orifice 83 are disposed in the branch passage 783. The check valves 62, 63 prevent brake fluid flow from one of the wheel brake cylinders 52, 53 to the other wheel brake cylinders 52, 53.

The wheel brake cylinders 52, 53 are connected to the main passage 76 between the master cylinder 2 and the change over valve 36 via a return passage 80. The return passage 80 includes a main passage 805 and a pair of branch passages 802, 803. The main passage 805 is connected to the pressure chamber 2b. The branch passages 802, 803 branch from the main passage 805 and are connected to the wheels FL, RR, respectively. Check valves 66, 68 are disposed in the branch passages 802, 803 to only permit brake fluid flow from the wheel brake cylinders 52, 53 to the master cylinder 2.

The above-described solenoid valves 31–36 and the motor 20 are electrically connected to an electronic controller 10. The electronic controller 10 controls the solenoid valves 31–36 and the motor 20. Wheel speed sensors 41–44 are provided at the respective wheels FR, FL, RL, RR, and are connected to the electronic controller 10. The wheel speed sensors 41–44 sense the rotational speeds of the wheels (hereinafter, referred to as wheel speeds) and supply the corresponding signal to the electronic controller 10.

There is also provided a brake switch 45. The brake switch 45 is turned on when the brake pedal 1 is depressed and is turned off when the brake pedal 1 is released. The brake switch 45 is also connected to the electronic controller 10.

Having described the features of the control device, the operation of the system is as follows. When the brake pedal 1 is depressed by a driver, the master cylinder 2 generates hydraulic pressure in response to the depression of the brake pedal 1. As a result, the hydraulic pressure in the pressure chambers 2a, 2b of the master cylinder 2 is supplied to the wheel brake cylinders 51 to 54 so that a braking force is applied to the wheels FR, FL, RL, RR. On the other hand, when the brake pedal 1 is released, the hydraulic pressure in the master cylinder 2 is decreased. As a result, the brake fluid in the wheel brake cylinders 51 to 54 is returned to the master cylinder 2.

When the slip rate of, for example, the front right wheel FR exceeds a first threshold value during the depression of the brake pedal 1 (i.e., the front right wheel FR tends to be locked), the change over valve 35 is switched to the operation position and the pump 21 is operated by the electronic controller. As a result, the front right wheel brake cylinder 51 is communicated with the sub reservoir 23 via the solenoid valve 31 and the change over valve 35. Thus, the brake fluid in the wheel brake cylinder 51 is discharged to the sub-reservoir 23 so that the hydraulic pressure in the wheel brake cylinder 51 is decreased. In this operation, the brake fluid in the sub-reservoir 23 is drawn by the pump 21.

When the slip rate of the front right wheel FR is reduced to a second threshold value which is lower than the first threshold value, the solenoid valve 31 is closed. As a result, the front right wheel brake cylinder 51 is prevented from communicating with the sub-reservoir 23. Thus, the brake fluid in the sub-reservoir 23 pressurized by the pump 21 is supplied to the wheel brake cylinder 51 via the orifice 81, so that the hydraulic pressure in the wheel brake cylinder 51 is slowly increased.

Figure 2:
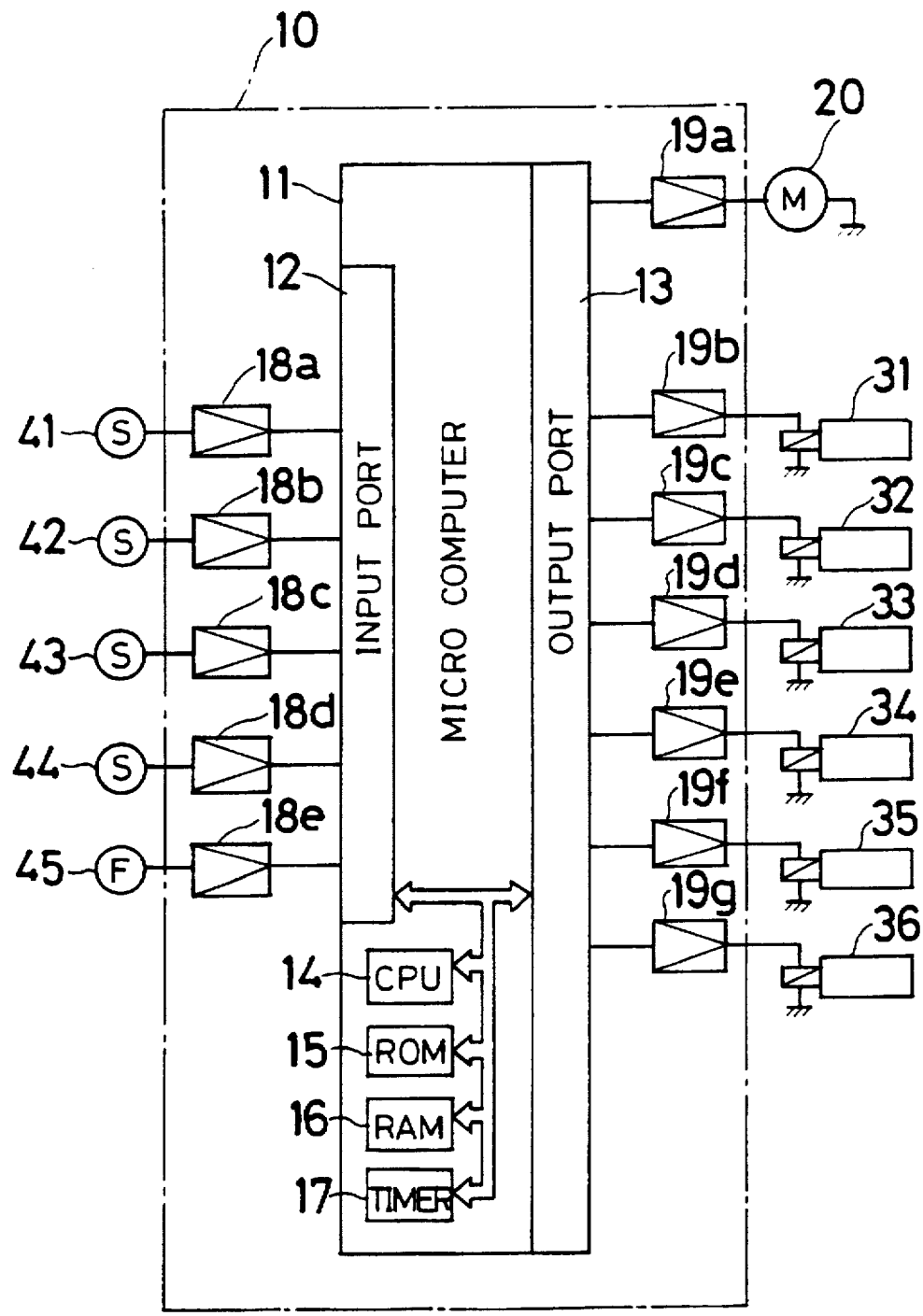
FIG. 2 is a block diagram illustrating the arrangement of the electronic controller shown in FIG. 1.

As shown in FIG. 2, the electronic controller 10 includes a microcomputer 11. The microcomputer 11 has a central processing unit or CPU 14, a read-only memory or ROM 15, a random access memory or RAM 16, and a timer 17. These devices 14, 15, 16, 17 are connected with an input port 12 and an output port 13 via a common bus to execute the input/output operations relative to external circuits. The signals sensed by the wheel speed sensors 41–44 and the brake switch 45 are fed to the input port 12 via respective amplification circuits 18a–18e and then to the CPU 14. Then, a control signal is output from the output port 13 to the motor 20 via a drive circuit 19a. Control signals are output from the output port 13 to the solenoid valves 31–36 via the respective drive circuits 19b–19g. In the microcomputer 11, the ROM 15 memorizes a program corresponding to flowcharts shown in FIGS. 3 to 10, the CPU 14 executes the program while the ignition switch (not shown) is closed, and the RAM 16 temporarily memorizes variable data necessary for executing the program.

The program routine executed by the electronic controller 10 for an anti-skid control is explained with reference to FIGS. 3 to 10. The program routine corresponding to the flowcharts as shown in FIGS. 3 to 10 starts when an ignition switch is turned on.

At Step 101, initialization of the system is provided to clear various data such as the wheel speed Vw, the wheel acceleration DVw or the like. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, an estimated vehicle speed Vso is calculated from the wheel speeds Vw of the four wheels as described in detail later with reference to FIG. 4.

Then, the program proceeds to Step 105 where a right vehicle speed VsoR and a left vehicle speed VsoL are calculated from the wheel speeds Vw as described in detail later with reference to FIG. 5. Next, at Step 106, vehicle speed differentials ΔVSENR, ΔVSENL between the right vehicle speed VsoR and the left vehicle speed VsoL are calculated from the right and left vehicle speeds VsoR, Vsol, as described in detail later with reference to FIG. 6. Next, at Step 107, a vehicle lateral acceleration DVsoY is calculated from the vehicle speed differentials ΔVSENR, ΔVSENL obtained at Step 106 and the estimated vehicle speed Vso obtained at Step 104 as described in detail later with reference to FIG. 8.

Then, the program proceeds to Step 108 where it is determined if the vehicle is cornering on the basis of the vehicle lateral acceleration DVsoY obtained at Step 107. It is determined that the vehicle is cornering if the vehicle lateral acceleration DVsoY exceeds a predetermined acceleration GHO, e.g., 0.2 G. Next, at Step 109, a coefficient of friction of the road (hereinafter, referred to as road-CF) is estimated on the basis of the wheel acceleration DVw of each drive wheel or a decreasing period of the hydraulic braking pressure in the wheel brake cylinder (e.g. 51) during the anti-skid control, etc.

Thereafter, at Step 110, the control mode is set. The control mode can be selected from amongst an increase mode (i.e. before anti-skid control), a decrease mode, a pulse increase mode and a hold mode, and is selected on the basis of the braking conditions determined by the wheel speed Vw, the wheel acceleration DVw and the estimated vehicle speed Vso. Next, at Step 111, it is determined if the selected control mode is the increase mode. In other words, it is determined if it is prior to anti-skid control. If so, the program proceeds to Step 112 where it is determined whether the vehicle is cornering. If so, the program proceeds to Step 113 where a hold mode signal is output to one of the solenoid valves 33, 34 and the motor 20, to thereby hold the hydraulic braking pressure in the inside rear wheel brake cylinder as described in detail later with reference to FIG. 9. If the vehicle is not cornering, the program proceeds to Step 114 where the increase mode signal is output so that the solenoid valves 31 to 36 is set to OFF as shown in FIG. 1.

If it is determined at Step 111 that the selected control mode is not the increase mode, the program proceeds to Step 116 where it is determined if the selected control mode is the decrease mode. If so, the program proceeds to Step 116 where a decrease mode signal is output. If it is determined at Stop 115 that the selected control mode is not the decrease mode, the program proceeds to Step 117 where it is determined if the selected control mode is the pulse increase mode. If so, the program proceeds to Step 118 where a pulse increase mode signal for alternately increasing and decreasing the hydraulic braking pressure is output. Otherwise, the program proceeds to Step 119 where a hold mode signal is output. Thereafter, at Step 120, it is determined if it is necessary that control form for the rear wheels RR, RL is switched as described in detail later with reference to FIG. 10. Then, the program returns to Step 102.

Figure 3:
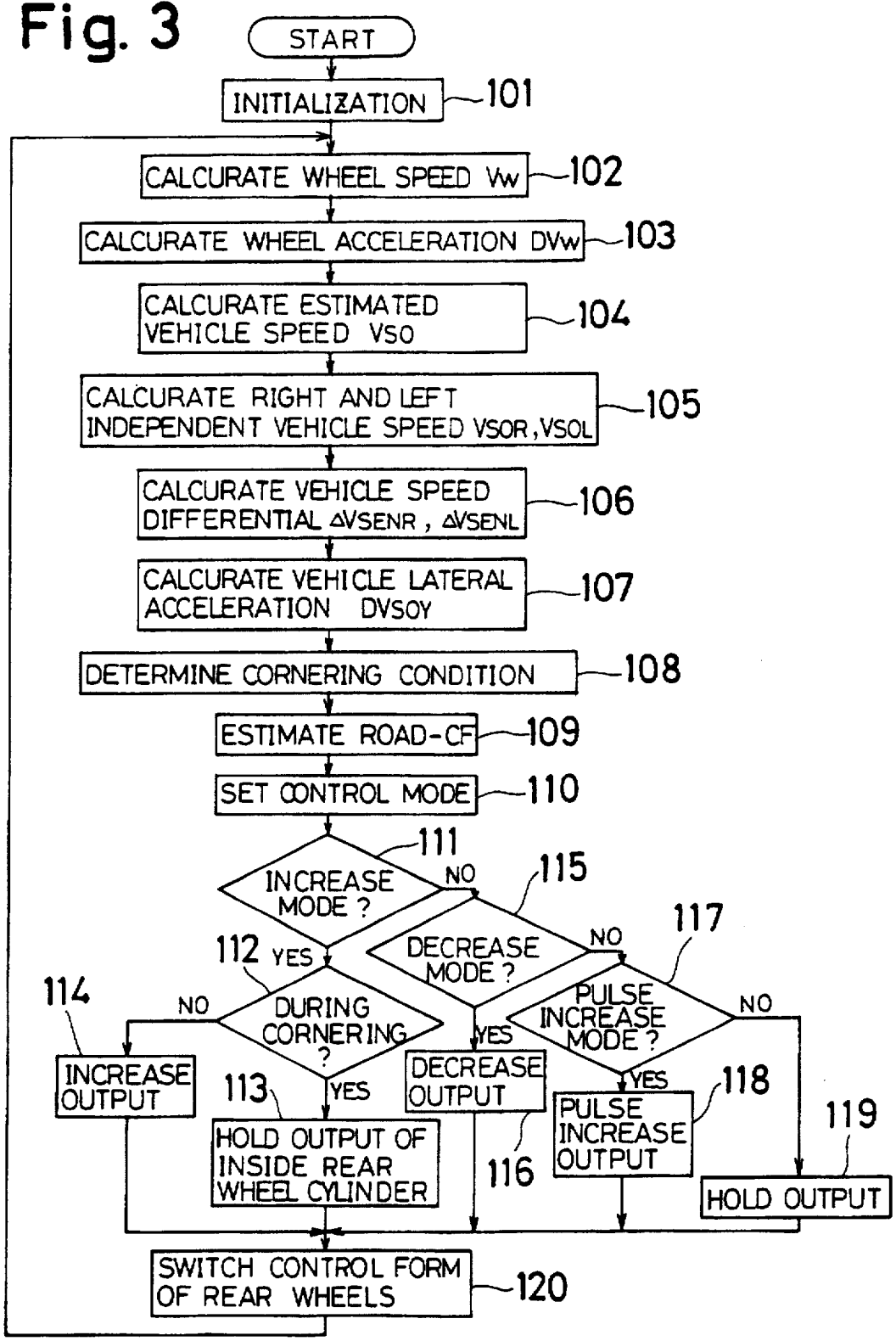
FIG. 3 is a flowchart showing the operation of the braking force control of the electronic controller shown in FIG. 2.
Figure 4:
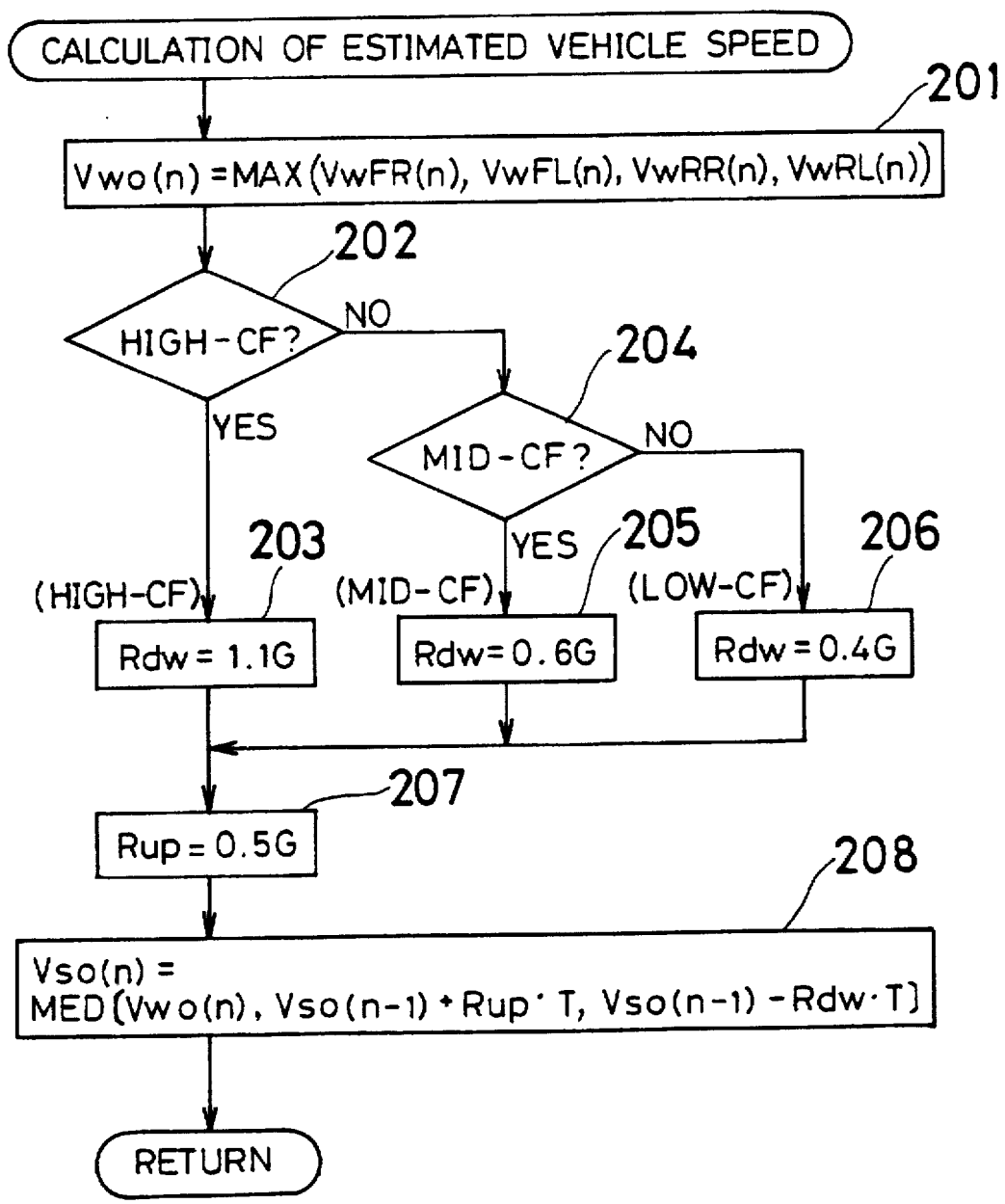
FIG. 4 is a flowchart showing the details of the calculation of the estimated vehicle speed shown in FIG. 3.

The estimated vehicle speed Vso in Step 104 of the flowchart of FIG. 3 is calculated according to the flowchart shown in FIG. 4. The maximum value of the wheel speeds VwFR(n) etc. of the four wheels is calculated at Step 201 every control cycle, e.g., 5 milliseconds, to provide the maximum wheel speed Vwo(n). In FIG. 4, "MAX" designates a function for calculating the maximum value of various data, and "FR" or the like designates the wheel on which the wheel speed is calculated. The term "(n)" designates the value which was obtained at the n'th cycle, wherein "n" is an integer which is equal to or more than one.

Then, the program proceeds to Step 202 where it is determined if the road-CF corresponds to a high-CF. If so, the program proceeds to Step 203 where a deceleration Rdw is set to a predetermined value, e.g., 1.1 G. If it is determined that the road-CF does not correspond to the high-CF, the program proceeds to Step 204 where it is determined if the road-CF corresponds to a mid-CF. If so, the program proceeds to Step 205 where the deceleration Rdw is set to e.g., 0.6 G. Otherwise, the program proceeds to Step 206 where the road-CF is determined to correspond to a low-CF so that the deceleration Rdw is set to e.g., 0.4 G.

Thereafter, the program proceeds to Step 207 where the acceleration Rup is set to, for example, 0.5 G and further the program proceeds to Step 208 where the estimated vehicle speed Vso(n) is calculated. That is, the intermediate or middle value is selected as the estimated vehicle speed Vso(n), out of: 1) the maximum wheel speed Vwo(n) obtained at Step 201; 2) the sum of the estimated vehicle speed Vso(n−1) at the previous cycle and the value obtained by multiplying the acceleration Rup and the cycle time T, i.e., Vso(n−1)+Rup T; and 3) the difference between the estimated vehicle speed Vso(n−1) at the previous cycle and the value obtained by multiplying the deceleration Rdw and the cycle time T, i.e., Vso(n−1)−Rdw T. In FIG. 4, "MED" designates a function for obtaining the intermediate value.

Figure 5:
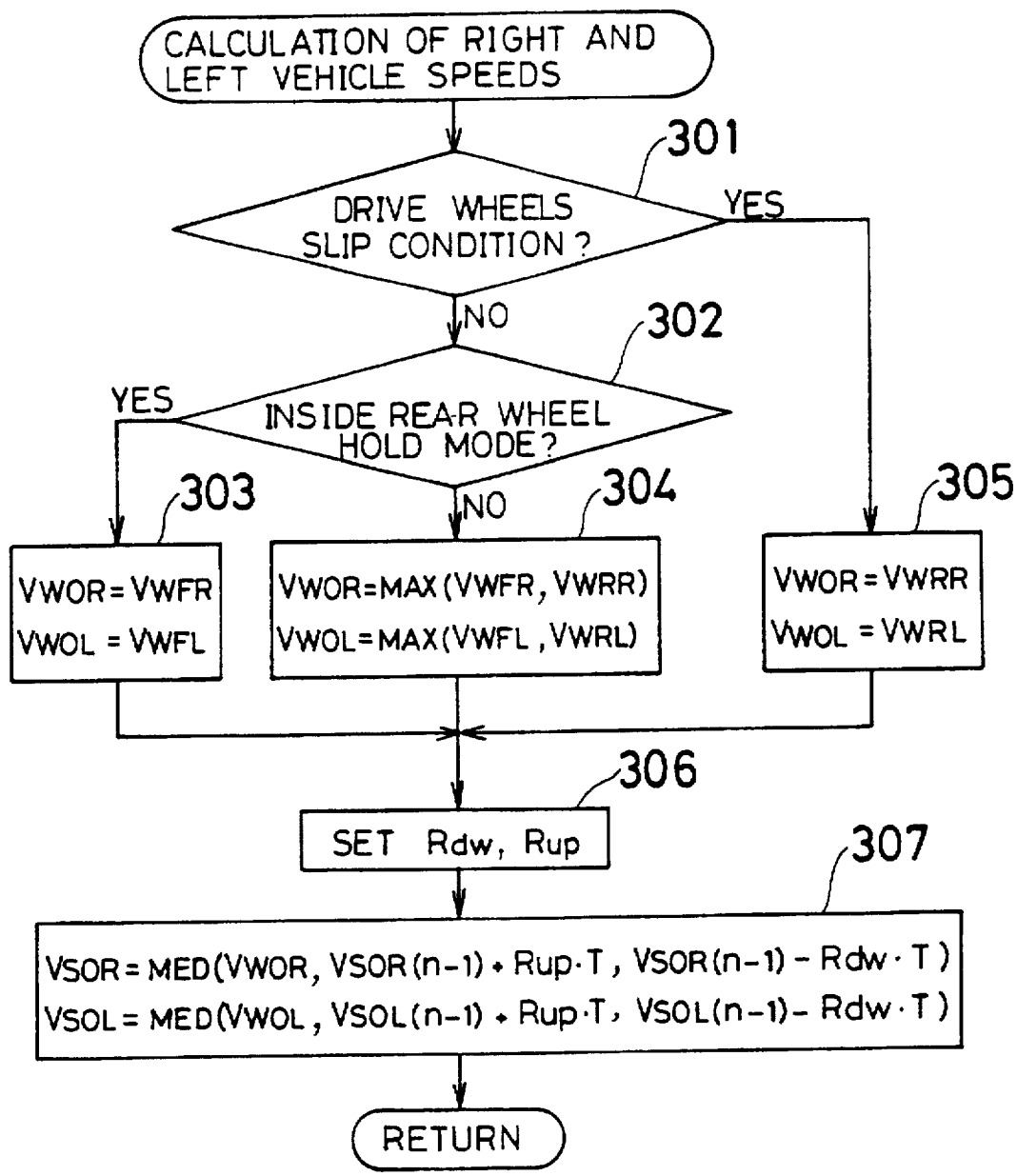
FIG. 5 is a flowchart showing the details of the calculation of the right and left vehicle speeds shown in FIG. 3.

The right and left vehicle speeds VsoR, VsoL in Step 105 of the flowchart of FIG. 3 are calculated according to the flowchart shown in FIG. 5. At Step 301, it is determined if the conditions of the drive wheels (i.e. the front wheels FR, FL) are acceleration slip conditions. That is, it is determined if the slip rates of the drive wheels exceed a predetermined value. If not, the program proceeds to Step 302 where it is determined if the control mode of the inside rear wheel is the hold mode. If so, the program proceeds to Step 303 where a right representation wheel speed VwoR is set to the wheel speed VwFR of the front right wheel FR and where a left representation wheel speed VwoL is set to the wheel speed VWFL of the front left wheel FL. If it is determined in Step 302 that the control mode of the inside rear wheel is the hold mode, the program proceeds to Step 304 where the right representation wheel speed VwoR is set to the maximum value of the wheel speed VwFR, VwRR of the front and rear right wheels FR, RR and where the left representation wheel speed VwoL is set to the maximum value of the wheel speed VwFL, VwRL of the front and rear left wheels FL, RL.

If it is determined at Step 301 that the conditions of the drive wheels are acceleration slip conditions, the program proceeds to Step 305 where the right representation wheel speed VwoR is set to the wheel speed VwRR of the rear right wheel RR and where the left representation wheel speed VwoL is set to the wheel speed VwRL of the rear left wheel RL.

Then, at Step 306, the deceleration Rdw and the acceleration Rup are set to the value equal to the foregoing predetermined value as shown in FIG. 4. Next, at Step 307, the right and left representation vehicle speeds VsoR, VsoL are calculated. That is, the intermediate or middle value is selected as the right representation vehicle speed VsoR, out of: 1) the right representation wheel speed VwoR; 2) the sum of the right representation vehicle speed VsoR(n−1) at the previous cycle and the value obtained by multiplying the acceleration Rup and the cycle time T, i.e., VsoR(n−1)+Rup T; and 3) the difference between the right representation vehicle speed VsoR(n−1) at the previous cycle and the value obtained by multiplying the deceleration Rdw and the cycle time T, i.e., VsoR(n−1)−Rdw T. Also, the left representation vehicle speed VsoL is calculated in the same maimer as the right representation vehicle speed VsoR.

Figure 6:
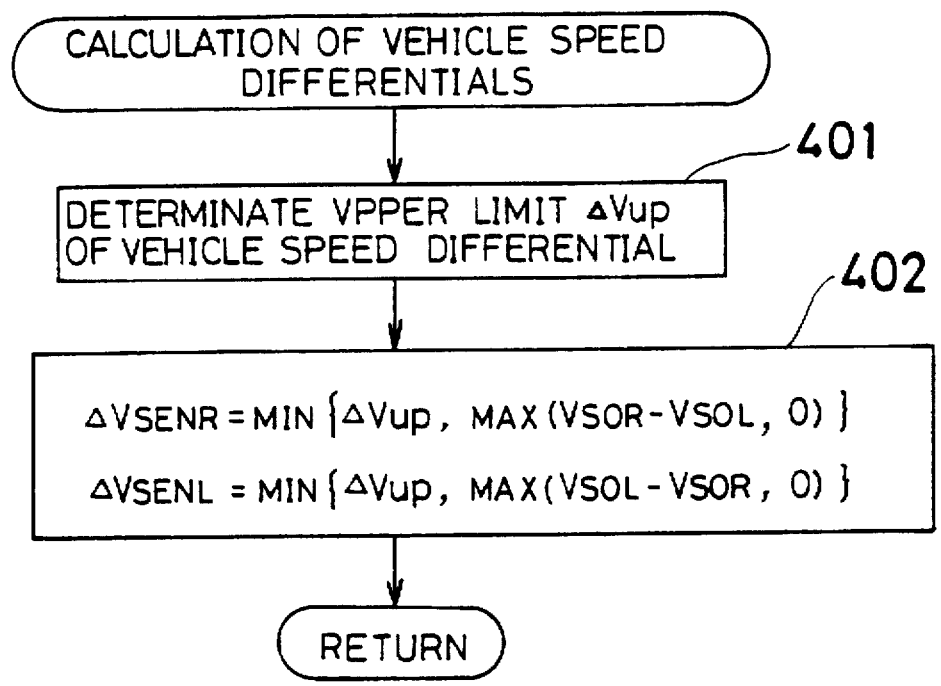
FIG. 6 is a flowchart showing the details of the calculation of the vehicle speed differentials shown in FIG. 3.
Figure 7:
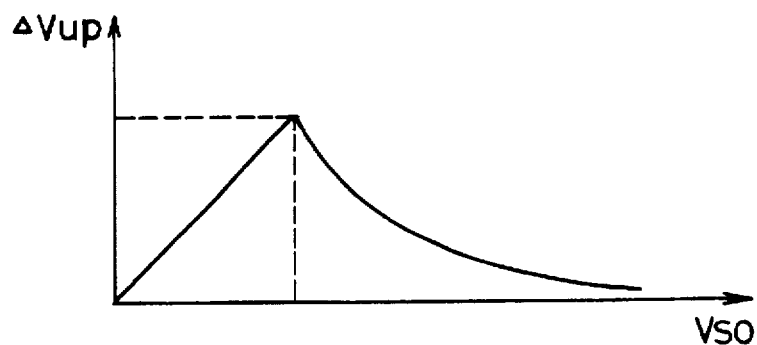
FIG. 7 is a diagram showing the relationship between the estimated vehicle speed and the upper limit of the vehicle speed differential in accordance with the present invention.

The vehicle speed differentials ΔVSENR, ΔVSENL in Step 106 of the flowchart of FIG. 3 are calculated according to the flowchart as shown in FIG. 6. At Step 401, an upper limit ΔVup of the vehicle speed differential is set on the basis of the estimated vehicle speed Vso as shown in FIG. 7. That is, the upper limit ΔVup of the vehicle speed differential is relatively high when the estimated vehicle speed Vso is relatively low, and the upper limit ΔVup is relatively low when the estimated vehicle speed Vso is relatively high.

Next, at Step 402, the vehicle speed differentials ΔVSENR, ΔVSENL, are set as follows. At first, the maximum of a difference between the right vehicle speed VsoR and the left vehicle speed VsoL (i.e. VsoR−VsoL ) and 0 is determined. Next, the minimum of the upper limit ΔVup of the vehicle speed differential and the aforementioned maximum is determined to provide one of the vehicle speed differentials ΔVSENR. Also, the maximum of a difference between the left vehicle speed VsoL and the right vehicle speed VsoR (i.e. VsoL−VsoR) and 0 is calculated. Next, the minimum of the upper limit ΔVup and the just calculated maximum is determined to provide the other vehicle speed differential ΔVSENL. In FIG. 6, "MIN" designates a function for calculating the minimum value of various data.

Figure 8:
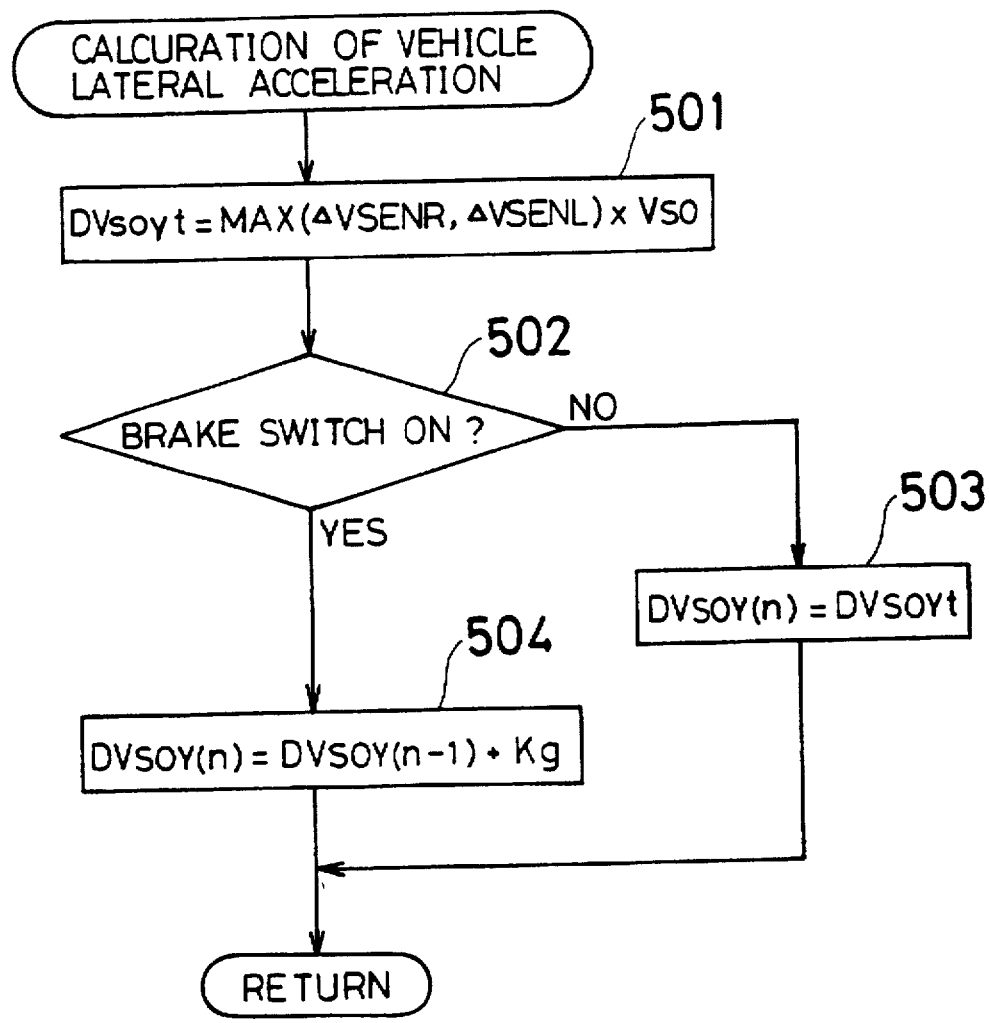
FIG. 8 is a flowchart showing the details of the calculation of the vehicle lateral acceleration shown in FIG. 3.

The vehicle lateral acceleration DVsoY in Step 107 of the flowchart of FIG. 3 is calculated according to the flowchart shown in FIG. 8. At Step 501, a temporary vehicle lateral acceleration DVsoYt is calculated from the vehicle speed differentials ΔVSENR, ΔVSFNL, and the estimated vehicle speed Vso. That is, the temporary vehicle lateral acceleration DVsoYt is set to the value obtained by multiplying the maximum of the vehicle speed differentials ΔVSENR, ΔVSENL and the estimated vehicle speed Vso. Next, at Step 502, it is determined if the brake switch is ON. If not, the program proceeds to Step 503 where the vehicle lateral acceleration DVsoY(n) is set to the temporary vehicle lateral acceleration DVsoYt. If it is determined in Step 502 that the brake switch is not ON, the program proceeds to Step 504 where the vehicle lateral acceleration DVsoY(n) is set to a value obtained by amending the vehicle lateral acceleration DVsoY(n−1) at the previous cycle by a limit value Kg of a change rate of the vehicle lateral acceleration. The limit value Kg is set to a constant value.

The reason why the vehicle lateral acceleration can be calculated by multiplying the vehicle speed differentials ΔVSFNR, ΔVSFNL, and the estimated vehicle speed Vso is explained below. When the vehicle having a certain wheel tread T is cornering a road with a certain radius R at a certain angular velocity ω, an outside wheel speed of an outside wheel is equal to Rω and an inside wheel speed of an inside wheel is equal to (R−T)ω, so that a wheel speed differential between the inside and outside wheel speeds is equal to Tω. Since the wheel tread T is constant, the dimension of the wheel speed differentials Tω corresponds to [deg/sec]. Also, the dimension of the vehicle speed Vso corresponds to [m/sec]. Since "deg" is a dimensionless quantity, the dimension of the value obtained by multiplying the wheel speed differentials and the vehicle speed corresponds to $[m/sec^2]$, thus representing the lateral acceleration.

Figure 9:
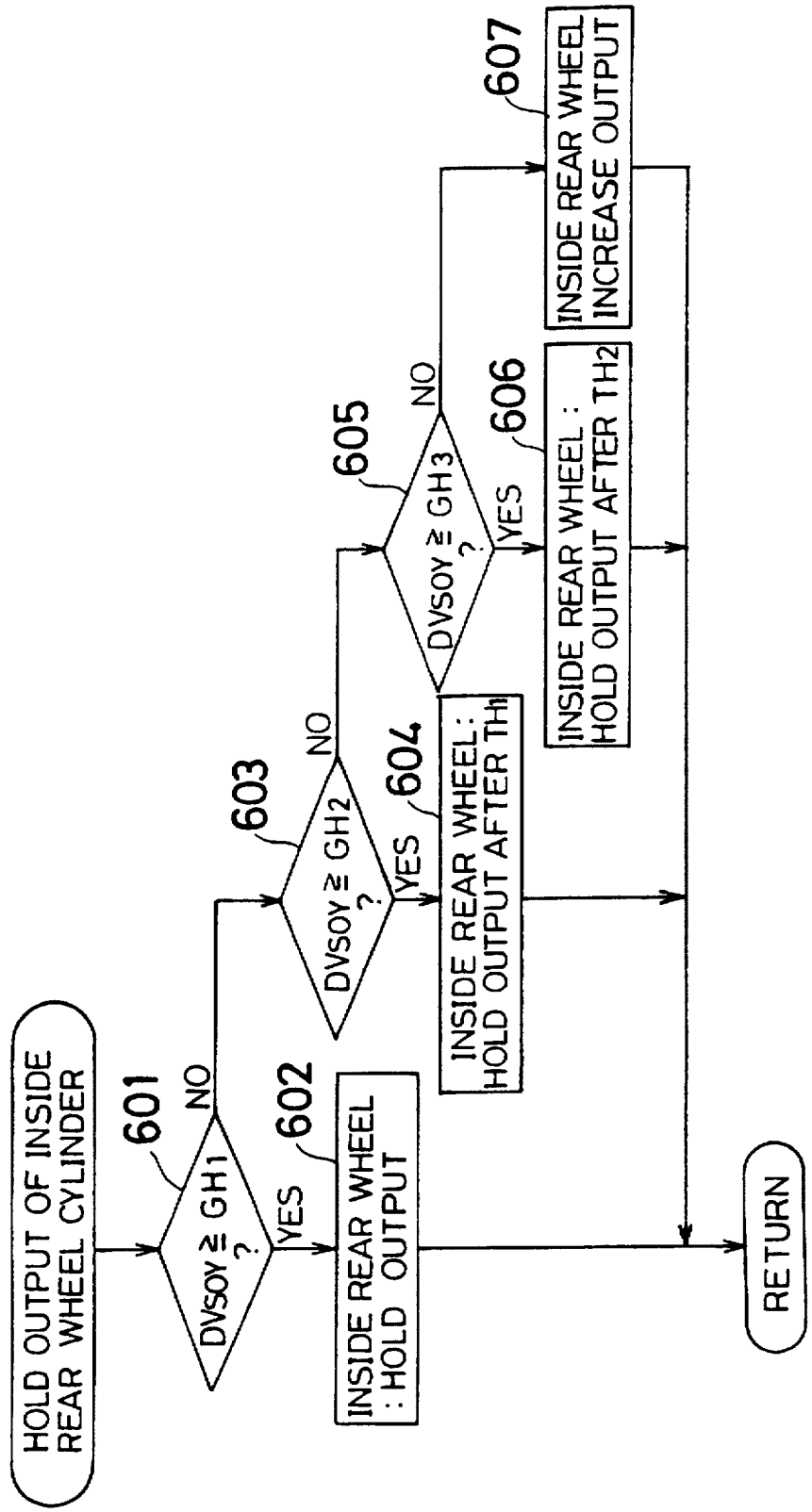
FIG. 9 is a flowchart showing the details of the hold output of the inside rear wheel brake cylinder shown in FIG. 3.

The hold mode signal for the inside rear wheel cylinder in Step 113 of the flowchart of FIG. 3 is output according to the flowchart as shown in FIG. 9. At Step 601, it is determined if the vehicle lateral acceleration DVsoY exceeds a first acceleration GH1 (e.g. 0.6 G). If so, at Step 602, the hold mode signal is immediately output to one of the solenoid valves 33, 34 and the motor 20, so that the hydraulic braking pressure in the inside rear wheel brake cylinder RR or RL is held immediately.

If it is determined that the vehicle lateral acceleration DVsoY does not exceed the first acceleration GH1, the program proceeds to Step 603 where it is determined if the vehicle lateral acceleration DVsoY exceeds a second acceleration GH2 (e.g. 0.5 G) which is lower than the first acceleration GH1. If so, the program proceeds to Step 604 where the hold mode signal is output to one of the solenoid valves 33,34 and the motor 20 after a first period TH1 (e.g. 5 msec), so that the hydraulic braking pressure in the inside rear wheel brake cylinder RR or RL is held after the first period TH1.

If it is determined in Step 603 that the vehicle lateral acceleration DVsoY does not exceed the second acceleration GH2, the program proceeds to Step 606 where it is determined if the vehicle lateral acceleration DVsoY exceeds a third acceleration GH3 (e.g. 0.4 G) which is lower than the second acceleration GH2. If so, the program proceeds to Step 606 where the hold mode signal is output to one of the solenoid valves 33, 34 and the motor 20 after a second period TH2 (e.g. 10 msec), so that the hydraulic braking pressure in the inside rear wheel brake cylinder RR or RL is held after the second period TH2. If it is determined at Step 605 that the vehicle lateral acceleration DVsoY does not exceed the third acceleration GH3, the program proceeds to Step 607 where the increase mode signal is output, so that the hydraulic braking pressure in the inside rear wheel brake cylinder RR or RL is increased. In other words, the hold mode signal is prohibited from being output.

Figure 10:
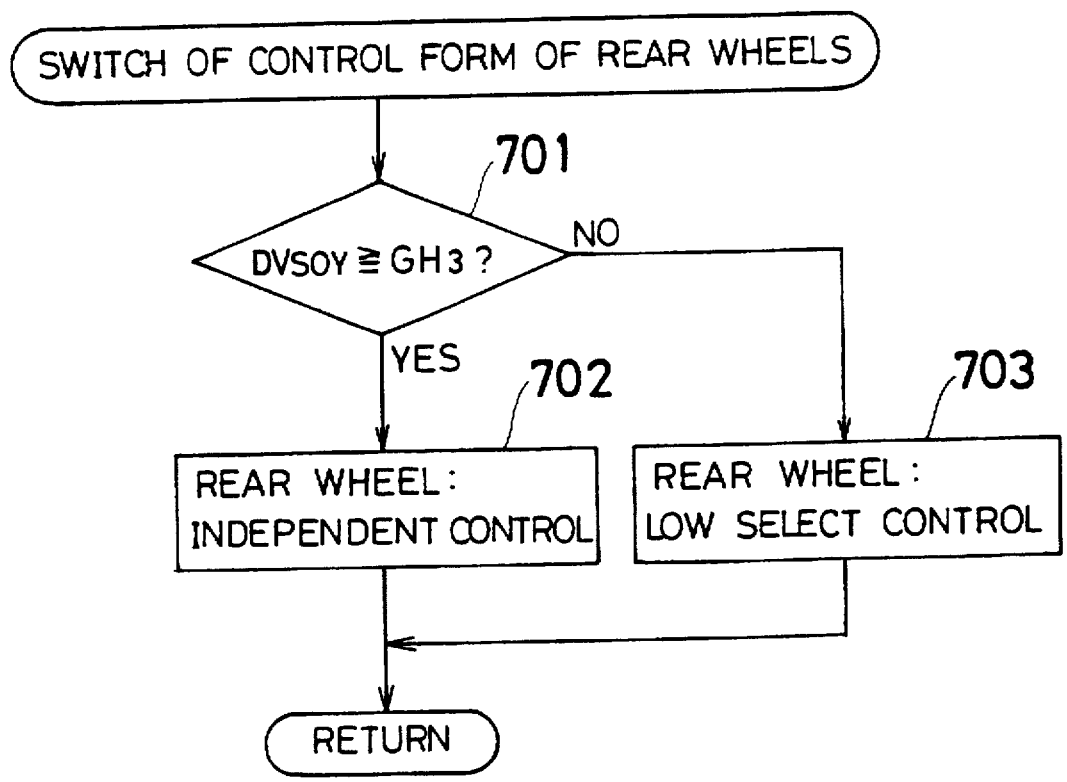
FIG. 10 is a flowchart showing the details of the control form switch of rear wheels shown in FIG. 3.

The control form for the rear wheels RR, RL in Step 120 of the flowchart of FIG. 3 is switched according to the flowchart shown in FIG. 10. At step 701, it is determined if the vehicle lateral acceleration DVsoY exceeds the third acceleration GH3 (e.g. 0.4 G). If so, the program proceeds to Step 702 where the control form for the rear wheels RR, RL is set to an independent control form. That is, the hydraulic braking pressure in the rear wheel brake cylinders 53, 54 is independently controlled on the basis of the braking conditions of the rear wheels RR, RL, respectively. If it is determined in Step 701 that the vehicle lateral acceleration DVsoY does not exceed the third acceleration GH3, the program proceeds to Step 703 where the control form for the rear wheels RR, RL is set to a low select control form. That is, the hydraulic braking pressure in the rear wheel brake cylinders 53, 54 is simultaneously controlled on the basis of the lower wheel speed of the rear wheels.

In this embodiment, since the vehicle lateral acceleration DVsoY is calculated from the vehicle speed differentials ΔVSENR, ΔVSENL, between the right and left vehicle speed VsoR, VsoL and the vehicle speed Vso, the vehicle lateral acceleration can be estimated without using a lateral acceleration sensor. Therefore, the control device of the present invention is less expensive than the conventional device.

Further, since the hydraulic braking pressure in the inside rear wheel cylinder is held when the vehicle lateral acceleration DVsoY exceeds the third predetermined acceleration GH3 during the increase mode (before the anti-skid control), the inside rear wheel to which the smallest load is applied during cornering and braking is prevented from being locked the earliest of the four wheels. As a result, the vehicle is quite stable.

Further, the hydraulic braking pressure in the inside rear wheel cylinder is held relatively earlier when the vehicle lateral acceleration DVsoY exceeds the second predetermined acceleration GH2 and the hydraulic braking pressure in the inside rear wheel is held relatively later when the vehicle lateral acceleration DVsoY is lower than the second predetermined acceleration GH2. As a result, the braking force of the inside rear wheel is sufficient so that the braking distance of the vehicle can be reduced.

Further, since the control form for the rear wheels is switched from the low select control form to the independent control form when the vehicle lateral acceleration DVsoY exceeds the predetermined acceleration GH3 during the anti skid control, the hydraulic braking pressure in the outside rear wheel cylinders is prevented from decreasing with the hydraulic braking pressure in the inside rear wheel cylinder. Therefore, the braking distance of the vehicle can be reduced.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An anti-skid control device for controlling a braking force applied to a plurality of wheels of an automotive vehicle which has a right hand side and a left hand side, comprising:

a plurality of wheel brake cylinders each operatively connected to a respective one of the plurality of wheels for applying a braking force to the wheel;

hydraulic pressure generating means for generating hydraulic pressure in response to depression of a brake pedal and for supplying the hydraulic pressure to the wheel brake cylinders;

a plurality of hydraulic circuits each connecting the hydraulic pressure generating means to a respective one of the brake cylinders;

hydraulic pressure control means disposed in each hydraulic circuit for controlling the hydraulic pressure in each of the wheel brake cylinders;

wheel speed sensors for sensing wheel speed of each of the plurality of wheels;

vehicle speed calculation means for calculating a vehicle speed on the basis of the wheel speeds sensed by the wheel speed sensors;

right vehicle speed calculation means for calculating a right vehicle speed based on the wheel speed of one of the wheels on the right hand side of the vehicle sensed by the wheel speed sensors;

left vehicle speed calculation means for calculating a left vehicle speed based on the wheel speed of one of the wheels at the left hand side of the vehicle sensed by the wheel speed sensors;

speed differential calculation means for calculating a vehicle speed differential between the right vehicle speed calculated by the right vehicle speed calculation

11 means and the left vehicle speed calculated by left vehicle speed calculation means;

lateral acceleration calculation means for calculating a vehicle lateral acceleration on the basis of the vehicle speed differential calculated by the speed differential calculation means and the vehicle speed calculated by the vehicle speed calculation means;

anti-skid control means for controlling the hydraulic pressure control means in response to the wheel speeds sensed by the wheel speed sensors when a wheel tends to lock; and increase rate reduction means for controlling the hydraulic pressure control means to reduce an increase rate of the hydraulic pressure in an inside rear wheel when the vehicle lateral acceleration calculated by the lateral acceleration calculation means exceeds a first predetermined value before an anti skid control starts operating during depression of the brake pedal.

2. An anti-skid control device according to claim 1, wherein the lateral acceleration calculation means calculates the vehicle lateral acceleration by multiplying the vehicle speed differential calculated by the speed differential calculation means and the vehicle speed calculated by the vehicle speed calculation means.

3. An anti-skid control device according to claim 1, wherein the increase rate reduction means controls the hydraulic pressure control means to hold the hydraulic pressure in the inside rear wheel when the vehicle lateral acceleration calculated by the lateral acceleration calculation means exceeds the first predetermined value before the anti skid control starts operating during depression of the brake pedal.

4. An anti-skid control device according to claim 3, wherein the increase rate reduction means includes hold timing determination means for determining a timing to start holding the hydraulic pressure in the inside rear wheel on the bases of the vehicle lateral acceleration calculated by the lateral acceleration calculation means.

5. An anti-skid control device according to claim 4, wherein the hold timing determination means hastens the timing to start holding the hydraulic pressure in the inside rear wheel as the vehicle lateral acceleration calculated by the lateral calculation means increases.

6. An anti-skid control device according to claim 1, further including control form switching means for switching from a low select control form in which the hydraulic pressure of right and left rear wheels is controlled simultaneously on the basis of a lower rear wheel speed of rear wheel speeds sensed by the wheel speed sensors, to an independent control form in which the hydraulic pressure of the right and left rear wheels is controlled independently on the basis of the wheel speeds sensed by the wheel speed sensors when the vehicle lateral acceleration calculated by the lateral acceleration calculation means exceeds a second predetermined value during the anti skid control.

7. A vehicle lateral acceleration estimation device for estimating a lateral acceleration of an automotive vehicle having right and left hand sides and a plurality of wheels, comprising:

a plurality of wheel speed sensors for sensing wheel speeds of the plurality of wheels;

vehicle speed calculation means for calculating a vehicle speed on the basis of the wheel speeds sensed by the wheel speed sensors;

right vehicle speed calculation means for calculating a right vehicle speed on the basis of a wheel speed of one of the wheels at the right hand side of the vehicle sensed by the wheel speed sensors;

12 left vehicle speed calculation means for calculating a left vehicle speed on the basis of a wheel speed of one of the wheels at the left hand side of the vehicle sensed by the wheel speed sensors;

speed differential calculation means for calculating a vehicle speed differential between the right vehicle speed calculated by the right vehicle speed calculation means and the left vehicle speed calculated by left vehicle speed calculation means; and lateral acceleration calculation means for calculating a vehicle lateral acceleration on the basis of the vehicle speed differential calculated by the speed differential calculation means and the vehicle speed calculated by the vehicle speed calculation means.

8. A vehicle lateral acceleration estimation device according to claim 7, wherein the lateral acceleration calculation means calculates the vehicle lateral acceleration by multiplying the vehicle speed differential and the vehicle speed.

9. An anti-skid control device for controlling a braking force applied to a plurality of wheels of an automotive vehicle which has a right hand side and a left hand side, comprising:

a plurality of wheel brake cylinders each operatively connected to a respective one of the plurality of wheels for applying a braking force to the wheel;

hydraulic pressure generating means for generating hydraulic pressure in response to depression of a brake pedal and for supplying the hydraulic pressure to the wheel brake cylinders;

a plurality of hydraulic circuits each connecting the hydraulic pressure generating means to a respective one of the brake cylinders;

hydraulic pressure control means disposed in each hydraulic circuit for controlling the hydraulic pressure in each of the wheel brake cylinders;

wheel speed sensors for sensing wheel speed of each of the plurality of wheels;

vehicle speed calculation means for calculating a vehicle speed on the basis of the wheel speeds sensed by the wheel speed sensors;

right vehicle speed calculation means for calculating a right vehicle speed based on the wheel speed of one of the wheels on the right hand side of the vehicle sensed by the wheel speed sensors;

left vehicle speed calculation means for calculating a left vehicle speed based on the wheel speed of one of the wheels at the left hand side of the vehicle sensed by the wheel speed sensors;

speed differential calculation means for calculating a vehicle speed differential between the right vehicle speed calculated by the right vehicle speed calculation means and the left vehicle speed calculated by left vehicle speed calculation means;

lateral acceleration calculation means for calculating a vehicle lateral acceleration on the basis of the vehicle speed differential calculated by the speed differential calculation means and the vehicle speed calculated by the vehicle speed calculation means;

anti-skid control means for controlling the hydraulic pressure control means in response to the wheel speeds sensed by the wheel speed sensors when a wheel tends to lock.

10. An anti-skid control device according to claim 9, further including control form switching means for switching from a low select control form in which the hydraulic pressure of right and left rear wheels is controlled simultaneously on the basis of a lower rear wheel speed of rear wheel speeds sensed by the wheel speed sensors, to an independent control form in which the hydraulic pressure of the right and left rear wheels is controlled independently on the basis of the wheel speeds sensed by the wheel speed sensors when the vehicle lateral acceleration calculated by the lateral acceleration calculation means exceeds a second predetermined value during the anti skid control.

11. An anti-skid control device according to claim 9, wherein the lateral acceleration calculation means calculates the vehicle lateral acceleration by multiplying the vehicle speed differential calculation means and the vehicle speed calculated by the vehicle speed calculation means.

* * * * *